Figure 1:
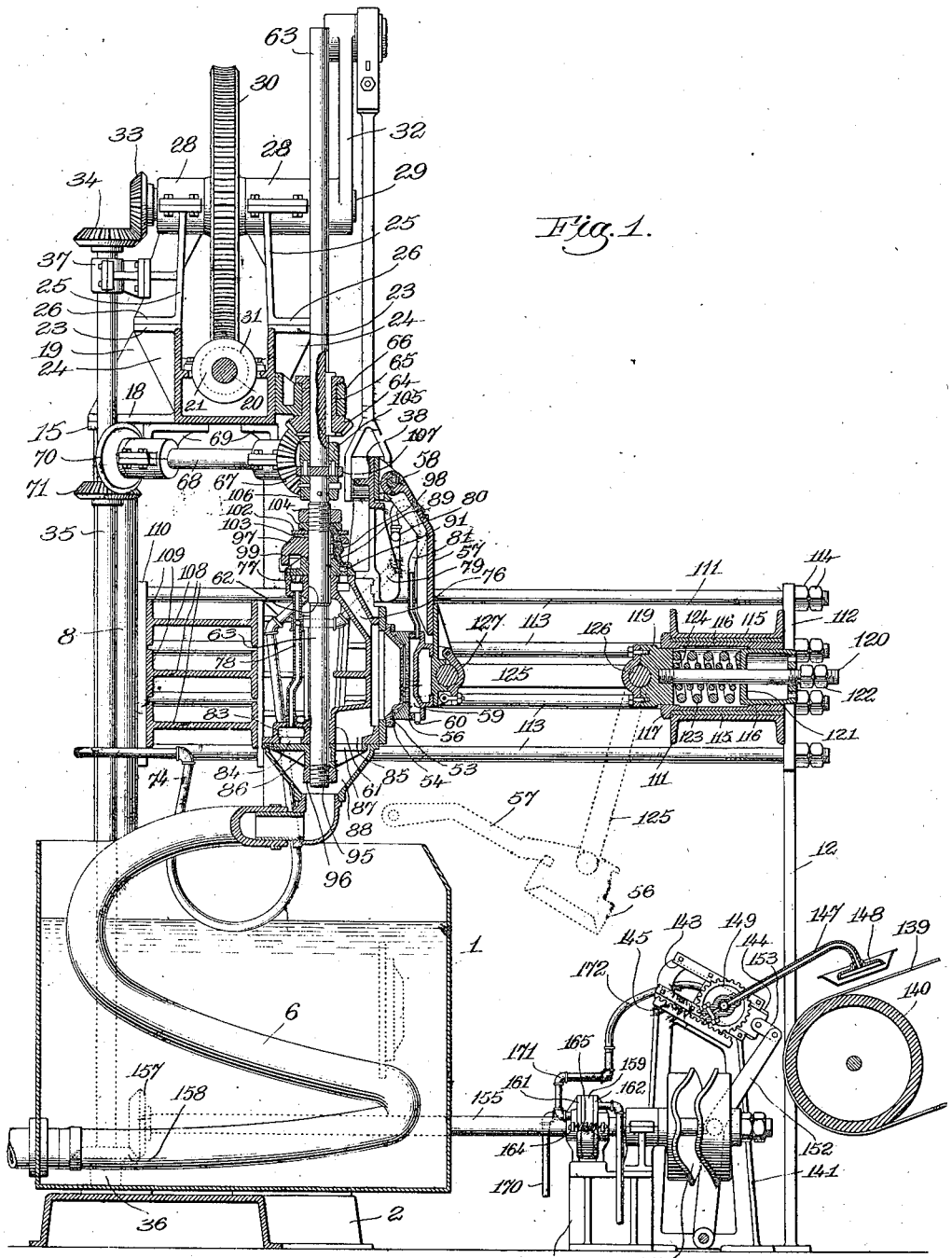

M. P. CHAPLIN.
APPARATUS FOR MAKING PULP ARTICLES.
APPLICATION FILED DEC. 26, 1911.

1,158,635.

Patented Nov. 2, 1915.
5 SHEETS—SHEET 4.

Witnesses:
Thomas J. Drummond
Warren O'Neil

Inventor.
Merle P. Chaplin,
by Edward Hale Smith,
attys.

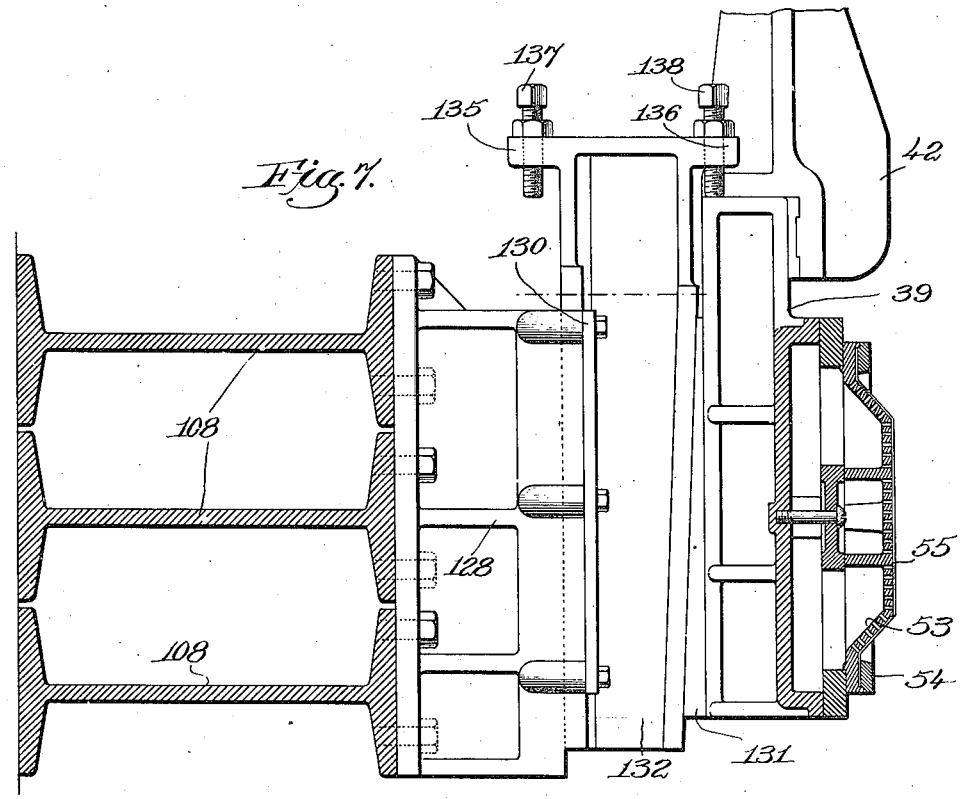
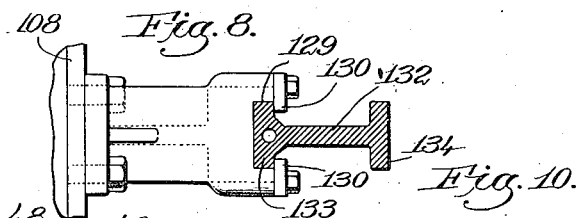
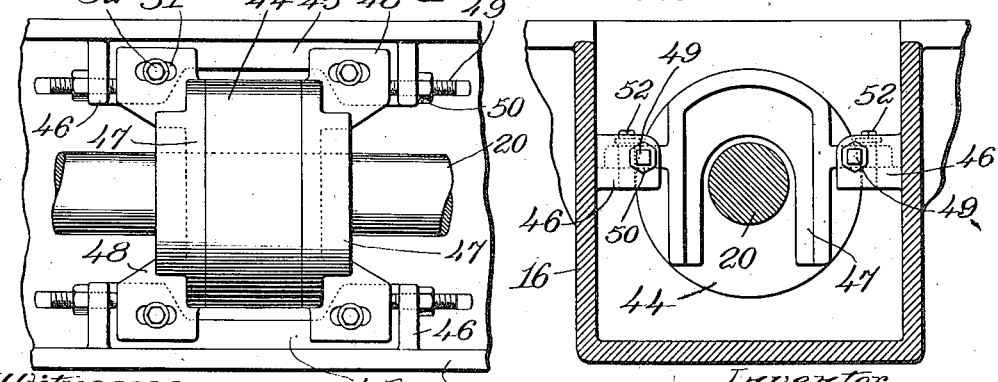

UNITED STATES PATENT OFFICE.

MERLE P. CHAPLIN, OF FAIRFIELD, MAINE, ASSIGNOR TO KEYES FIBRE COMPANY, OF WATERVILLE, MAINE, A CORPORATION OF MAINE.

APPARATUS FOR MAKING PULP ARTICLES.

1,158,635.  Specification of Letters Patent.  Patented Nov. 2, 1915.

Application filed December 26, 1911. Serial No. 667,944.

*To all whom it may concern:*

Be it known that I, MERLE P. CHAPLIN, a citizen of the United States, residing at Fairfield, Maine, have invented an Improvement in Apparatus for Making Pulp Articles, of which the following description, in connection with the accompanying drawing, is a specification, like characters on the drawing representing like parts.

This invention relates to an apparatus for making pulp articles, such for example, as pie plates, butter trays and other articles.

In my prior application, No. 564,917, filed June 4, 1910, is illustrated and described an apparatus having many of the broad characteristic features of the present invention, and the present application is a continuation of the said prior application so far as the subject matter of the two is common, and the broader claims will be made in the present application.

This invention presents a number of novel features in an apparatus of this character, as will be seen from the accompanying drawings, and these features will be particularly pointed out in the appended claims.

In my prior application the molded article was discharged directly from the pivoted or swinging mold member to the conveyer or receiving device, but in the form of the invention illustrated in this application a transferring device first receives the molded article and then, swinging in a vertical plane, deposits it upon the conveyer. This enables the molded article to be laid with its hollow side upward upon the conveyer, and it is found that the article dries best in this position. In its broader aspect, however, the invention is not restricted to any particular form of receiving device, and this term may include either the transferrer, conveyer, both such devices, or any other suitable device for receiving the completed article.

The compressing device of this invention is arranged to provide a separate and independent compressor for each of the said mold members, so that the compressing action may be substantially uniform in each case.

Another novel feature resides in the floating wedge construction, by means of which the powerful compressing force is applied to the vertically movable mold-carrying frame without disturbing the lateral position thereof.

The drawings show a preferred form of machine embodying the invention.

Figure 2:
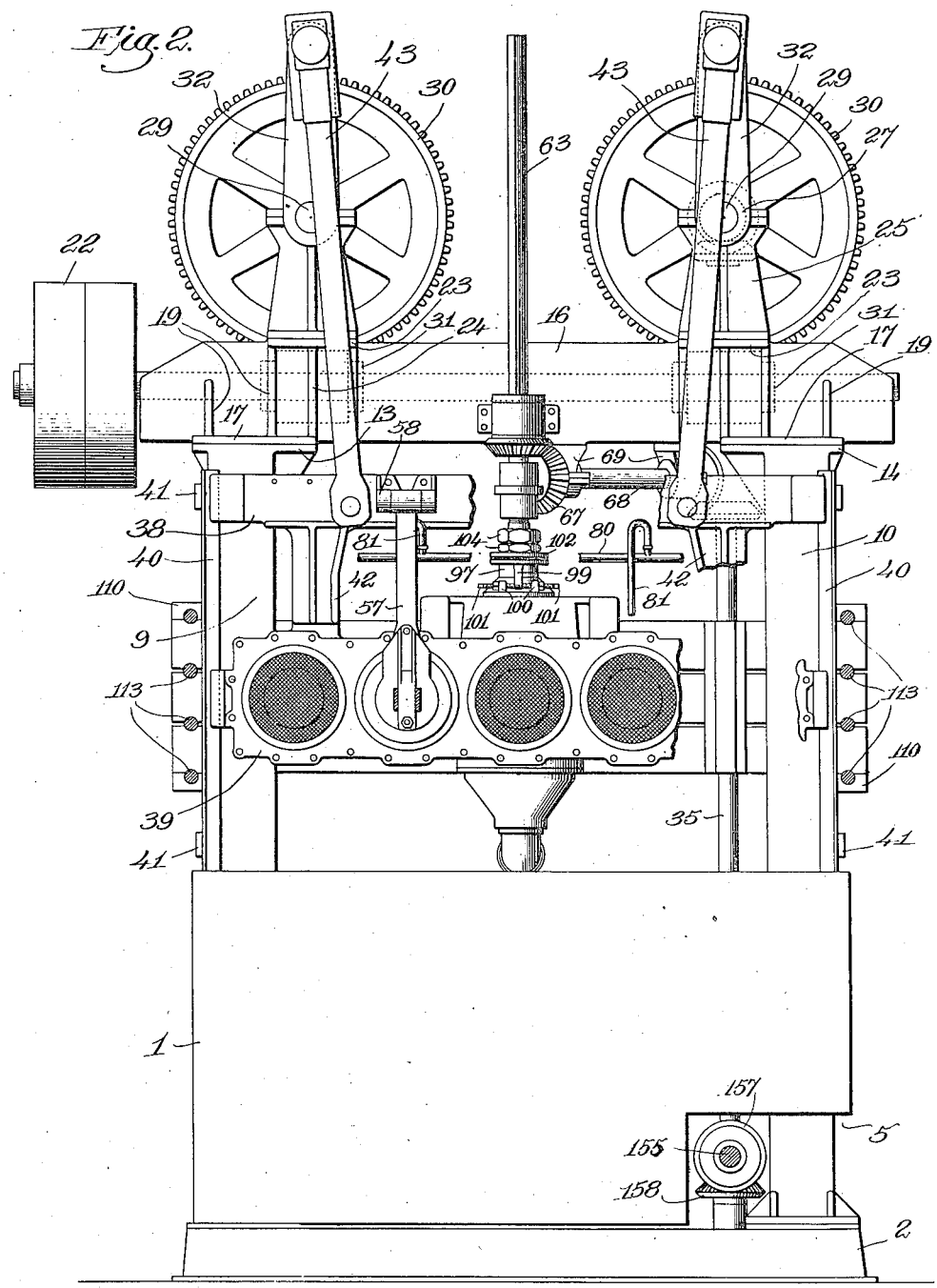
Figure 3:
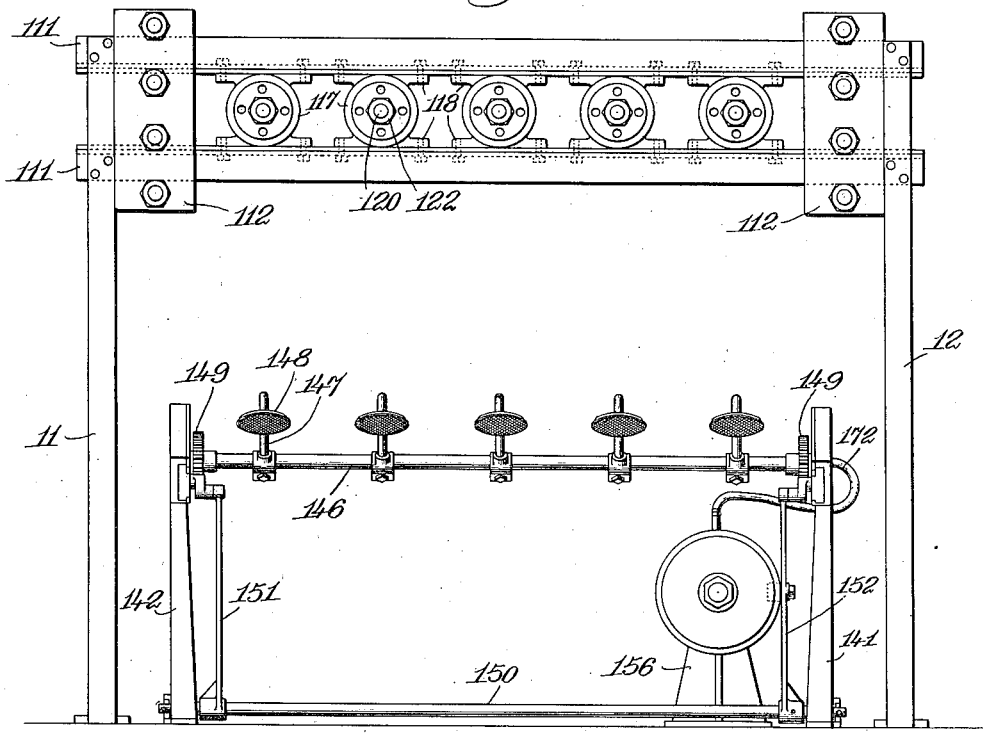
Figure 4:
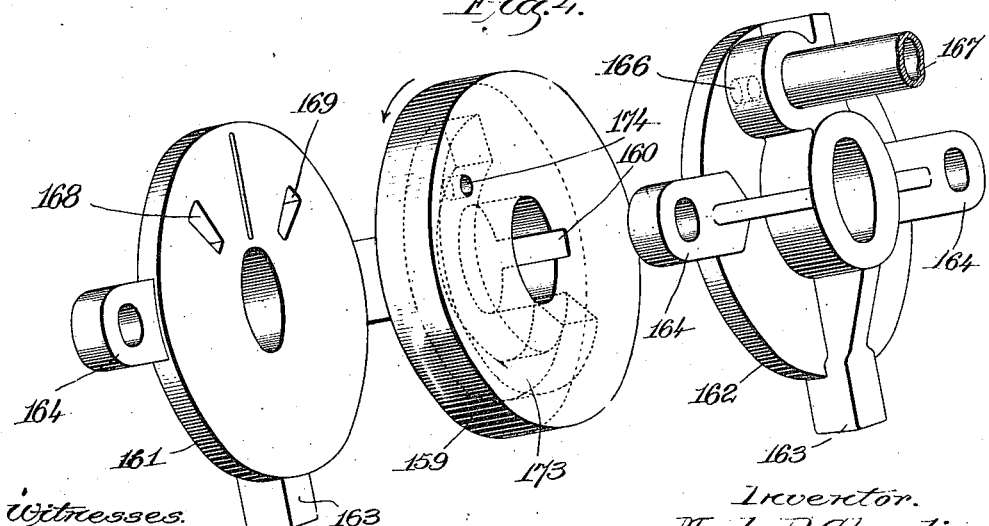
Figure 5:
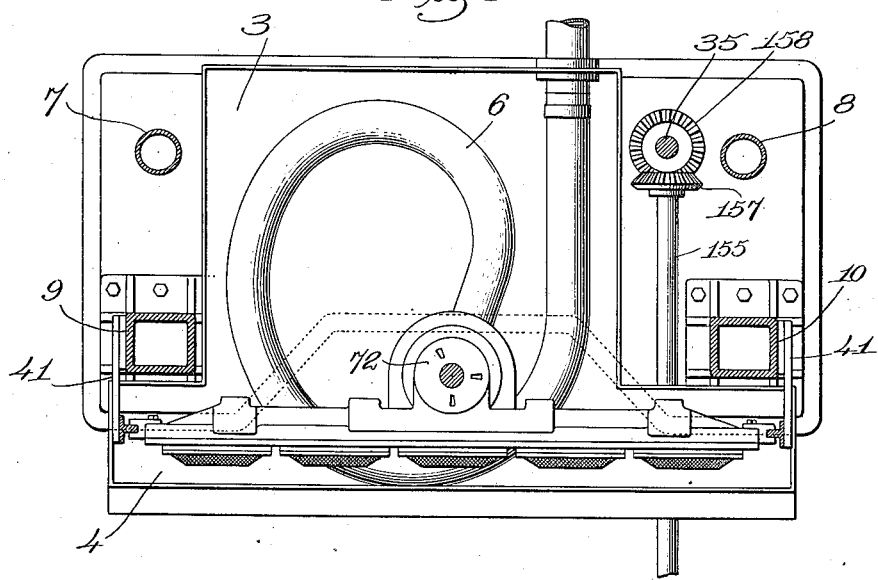
Figure 6:
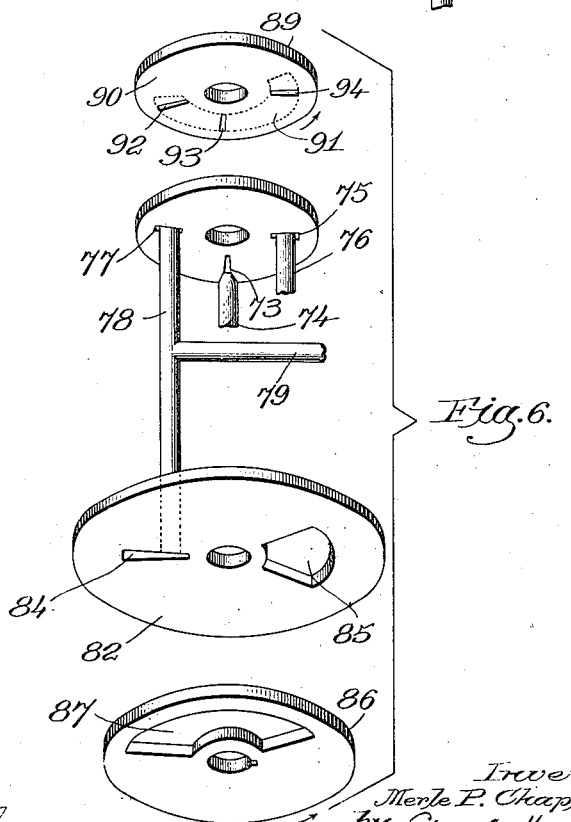

In the drawings Figure 1 is a view chiefly in vertical central cross section of the entire apparatus. Fig. 2 is a front elevation of the apparatus with some of the parts removed and some broken away, this view being taken from a point close to the vat. Fig. 3 is a front elevation of the extreme front portion of the apparatus with the vat and the parts directly above omitted. Fig. 4 is a perspective view of the members carrying the ports and valves for controlling the compression and vacuum in the transferring device, these members being shown separated. Fig. 5 is a view in transverse cross section of the apparatus taken above the top port member with parts of the apparatus removed. Fig. 6 is a perspective view showing the port members and valve member for controlling the compression and suction in the mold members. Fig. 7 is a side elevation of a portion of the apparatus partially in inverted cross section to show the floating wedge in its coöperation with the pulp receiving or forming mold member. Fig. 8 is a top plan view partially in transverse cross section of a portion of the construction shown in Fig. 7. Fig. 9 is a plan view of the central portion of the main shaft and frame of the apparatus to show the device for centering the shaft. Fig. 10 is an end elevation partially in vertical cross section of the construction shown in Fig. 9.

In the form of the machine illustrated the pulp vat is supported on a suitable base on the floor, and the main parts of the apparatus are supported about the vat on a frame having standards extending to the floor, while the transferring apparatus is supported on a secondary frame having independent standards extending to the floor.

The pulp vat 1 is supported on a base resting upon the floor, and this vat is of generally rectangular shape. To accommodate the particular frame shown, the rear portion 3 of the vat is considerably narrower than the front portion 4, which must be sufficiently wide to allow for the submersion of all the pulp receiving mold members. The vat is also shown as cut away at the lower right hand corner 5 to allow the passage of the shaft coöperating with the transferring device. The rear portion 3 of the vat enables it to hold a considerable quantity of pulp and provides a place for the vacuum hose 6, which aids in keeping the pulp in agitation and thus in homogeneous condition. The supply of liquid pulp is maintained in the vat by ordinary means, which it is unnecessary to describe or illustrate.

The main portion of the frame of the machine in the form shown is supported by six standards, two of which are shown as round columns 7 and 8 rising vertically from the base near the rear corners, two as square columns 9 and 10 rising vertically from the base directly behind the front portion 4 of the vat, and the other two of which are shown as angle irons 11 and 12 rising vertically from the floor and well at the front of the machine. The columns 9 and 10 terminate at their upper end in extended caps 13 and 14, and the columns 7 and 8 in extended caps 15. A heavy cross bar 16 of rectangular cross section, open at the top is provided with laterally projecting flanges 17 on its front face resting on and secured to the caps 13 and 14, and laterally projecting flanges 18 on its rear face resting on and secured to the caps 15. These flanges projecting from the cross bar 16 are braced by suitable vertical webs 19.

The hollow cross bar 16 contains the main shaft 20 supported in suitable bearings 21 connected to the interior of the cross bar, and is driven from any suitable source of power by the pulley 22. The cross bar 16 near its end is provided at each side at the top with outward extending horizontal flanges 23, braced by the vertical webs 24. The vertical webbed standards 25 are secured by means of their horizontal outward extending flanges 26 to the said flanges 23 at each side and at each end of the cross bar, and horizontal bearings 27 are formed partly in the tops of these standards and in the flanged bearing caps 28 bolted thereto. A horizontal shaft 29 is mounted at each of said bearings and extends transversely of and above the cross bar 16 near each end. Each shaft 29 has rigidly mounted thereon between the bearings worm wheels 30 which extend down into the hollow cross bar and each of these worm wheels is driven in an opposite direction by the right and left hand worms 31 therebetween and fast on the main shaft 20. At the front the shafts 29, which are thus driven from the main shaft 20, are provided with crank arms 32, which, as will be explained, give up and down movement to the molds, while the rear end of one of these shafts 29 is provided with a beveled gear 33 engaging and driving a beveled gear 34 on the upper end of a vertical shaft 35 having its lower bearing 36 on the base 2, and its upper bearing 37 bolted to one of the rear standards 25. This vertical shaft 35, as will be explained, operates the means for controlling the admission of compression and vacuum to the mold members, and also operates the transferring device and the means for controlling the admission of compression and vacuum thereto.

In the operation of the machine the members of each mold move simultaneously but in different paths. The pulp-receiving mold member as it rises from the vat meets the compressing mold member on its return from having discharged a previous plate to the transferring device, and the two mold members continue their movement between the compressing device to form the plate. On the return movement the pulp-receiving mold member moves down into the pulp, while the compressing mold member moves down to deliver its plate to the transferring device.

In the construction shown herein, the pulp-receiving mold member, or the member upon which the pulp is formed, is the male member, and moves vertically in a path between the vat and the compressing device, while the other member which compresses the plate is of the female type and is pivoted with respect to the pulp-receiving mold member, and moves in a path between the transferring device and the compressing device. A plurality of molds are shown, all operating simultaneously, and in the drawings there are five complete sets of molds.

These molds are mounted upon a vertically moving plunger. This plunger is of a framework construction, comprising cross bars 38 and 39 sliding at their ends on vertical guides 40 supported over the tank by suitable connections with the frame of the machine such as the bars 41. The cross bars 38 and 39 are connected at desired intervals by the vertical webbed struts 42. This frame is given a rising and falling movement by means of links 43 pivoted at their lower ends to opposite ends of the cross bar 38 and at their upper ends to the crank arms 32 already described. It will be remembered that the crank arms 32 rotate in opposite directions, and thus a steady and even movement is imparted to the mold-carrying frame, the molds rising and falling evenly and without tipping. The balanced and symmetrical relation of the parts is further secured by the provision of a centering device for the main shaft 20. A suitable form of centering device is illustrated in detail in Figs. 9 and 10 of the drawings. A drum 44 is rigidly connected to the shaft 20, preferably at the center of said shaft.

The opposite vertical inside walls of the hollow cross bar 16 are provided with horizontally extending shelves 45, and each end of each shelf has a vertical flange 46, and horizontally flanged vertical adjusting plates 47 are mounted at each side the drum 44 with their flanges 48 resting on the shelves 45. Adjusting set screws 49, provided with lock nuts 50 are mounted one in each vertical flange 46 and abut against the edge of the adjacent flange 48. It will thus be seen that by means of these adjusting set screws the central position of the shaft may be accurately maintained at all times. The flanges 48 are provided with longitudinal slots 51 and set screws 52 pass therethrough into the shelves 45, by means of which adjusting plates 47 are locked in their adjusted positions.

The lower cross bar of the vertically movable mold-carrying frame is hollow, and on its face are mounted over suitable apertures therein the mold-receiving members 53 herein represented as male members, adapted to conform to the inside of a hollow article such as a pie plate. These members are apertured throughout and covered with suitable reticulated material such as fine wire gauze. A ring or raised ledge 54 surrounds the mold member and defines the edge of the dish or plate, and as illustrated, the wire gauze may be clamped at its edge to the mold member 53 by this ring 54.

The opposing mold members 56 are constructed similar to the mold members 53, but are of the female type, and when in closed position fit at their edges within the ring 54. Each of these mold members is mounted upon an arm 57, and each arm is independently hinged or pivoted at 58 to the upper cross bar 38 of the vertically movable mold-carrying frame, so that the mold member carried thereby may be swung into and out of coöperation with the opposing mold member. A hollow chamber 59 is formed in the lower end of each swinging arm 57 behind the perforated face of the mold member, and small drainage valves 60 are provided therefor.

Suction or compression is applied to each mold member as required during the operation of forming the plate or other article. This is secured in the device illustrated by the following construction. The lower hollow cross bar 39 is extended at the rear central portion to present vertically alined bearings 61, 62, and in these bearings the vertical shaft 63 is rotatably mounted. This shaft passes through a beveled gear 64, the hub 65 of which is rotatably mounted in a bearing 66 projecting from the front face of the main cross bar 16, and this gear 64 is keyed to the shaft 63 so that the shaft while reciprocating through the gear may be rotated by it. This beveled gear 64 intermeshes with a beveled gear 67 on the end of the shaft 68, supported in bracket 69 from the bottom of the cross bar 16. The other end of the shaft 68 carries a beveled gear 70 intermeshing with a beveled gear 71 mounted on the shaft 35. Thus it will be seen that the shaft 63 is rotated from the shaft 35 whatever may be the vertical position of the shaft 63.

Connections for producing suction and compression in the mold members and the valves for controlling the suction and compression may be observed in vertical sectional view in Fig. 1, but will be perhaps better understood by referring to Fig. 6, which represents the main elements in perspective, separated and in somewhat of a diagrammatic form.

Those portions of the extension from the rear of the lower cross bar 39, in which are formed the bearings 61 and 62, are enlarged to form what may be designated as port members. The upper port member containing the bearing 62 presents a flat upper surface 72, see Fig. 5, and is provided with three ports suitably positioned and passing therethrough, to wit, the port 73 connected at the under side of the port member with a pipe 74 leading to a suitable source of compressed air; port 75 connected at the under side of the port member by a passageway 76 in the extension from the cross bar 39 to the hollow interior thereof connecting with the hollow recess behind the perforated faces of the male mold members; the port 77 connected at the under face of the port member to a pipe 78 extending down to the lower port member. From the pipe 78 a branch pipe 79 extends as shown in Fig. 1 to a cross pipe 80 running parallel with the cross bars 38 and 39 and between the same. From the cross pipe 80 flexible connecting pipes 81 extend and are connected respectively to the chambers 59 in the rear of the perforated faces of the female mold members. The lower port member containing the bearing 61 presents a lower flat surface 82, and is provided on its upper side with a chamber 83 with which the pipe 78 is connected. A port 84 extends from the lower surface of 82 to the chamber 83, thence through the pipes 78, 79 and 91 through a flexible connection to the hollow interior of the arm 57 behind the female mold member. A second port 85 extends through the lower port member and connects to the chamber behind the male mold members.

Upper and lower valve members are mounted on the shaft 63. The lower valve member 86 presents an upper flat surface fitting closely against the surface 82 of the lower valve member, and is provided with an extended opening 87 at the same radial distance from the axis as the ports 84 and 85. This lower port member opens into a large chamber 88, the walls of which fit snugly against the edge of the lower port member, and this chamber is connected with the vacuum hose 6, in turn connected with a suitable apparatus for maintaining a vacuum. The upper valve member 89 presents a lower flat surface 90 fitting snugly against the upper surface of the upper port member, and is provided with an extended segmental chamber 91 and with three ports 92, 93 and 94 opening from said chamber through the surface 90.

The lower valve member 86 is keyed as shown at 95 to the shaft 63 and held in vertical position thereon by the nut 96. Directly above the upper valve member an adjusting sleeve 97 is keyed as shown at 98 to the shaft 63 and is provided with a depending lug 99 extending down between lugs 100 projecting up from the upper valve member 89, and set screws 101 mounted on the lugs 100 and abutting against the lug 99, provided for a radial adjustment of the upper valve with respect to the shaft 63. A disk or washer 102 is mounted above the adjusting sleeve 97, and springs 103 are introduced therebetween. Lock nuts 104 are screwed onto the shaft 63 above the disk 102, and thus it will be seen that by adjusting the lock nuts 104 the upper and lower valve members are drawn into close and yielding contact with the upper and lower port members respectively.

The shaft 63 is made in two sections, united by a suitable form of flexible joint in order that any strains imparted to the frame carrying the mold members during its reciprocation may not be imparted to the gear 64. This flexible joint is shown as comprising sleeves 105 and 106 in the upper and lower sections of the shaft 63 respectively, and an intermediate disk 107 provided with apertures into which pins extend from the sleeves 105 and 106 and fit loosely, the sectional view in Fig. 1 showing only the pins extending from the upper sleeve.

The position and side of the various ports and chambers just described are determined by the timing of the operation of the machine, and may be readily calculated. Their size and relative position and arrangement are shown with approximate accuracy in Fig. 6. In the operation of the machine the frame carrying the mold members descends, the shaft 63 sliding through the gear 65 until the male mold member is immersed in the pulp, the female mold member swinging to the right and the mold members occupying substantially the position shown in dotted lines in Fig. 1, the pulp being agitated by the vacuum hose 6. During this descent, and as the male mold member enters the pulp, the shaft 63 has been rotated to bring the port 87 into connection with the port 85 and this connection is maintained causing suction to be produced behind the male mold members until the frame has reached its uppermost position and is ready to begin the next descent. During the main portion of this movement the port 84 is closed by the upper surface of the lower valve member. As the mold members come together at the end of the ascent the port 87 passes over the port 84 and suction is produced through the connections 78 and 79, the port 77 being closed, in the chambers 59 behind the female mold members, and this suction is maintained until the ends of the next descent when the female mold members are in the position shown in dotted lines. At the end of the first ascent the two mold members are brought together and squeezed by the compressing device, suction then being applied to both mold members in carrying off the water expressed as the molds start to descend. On the next descent the upper surface of the lower valve member closes the port 85 and the ports 73 and 75 are connected momentarily through the ports 93 and 94 and the chamber 91 in the upper valve member, causing a puff of compressed air in the male mold members which, together with the suction acting behind the female mold members, transfers the plate from the male to the female mold members. Then on the second descent the operations are repeated, suction being maintained in the female mold members until they attain the position indicated in dotted lines, and the plate is to be transferred therefrom, when the port 84 is closed by the lower valve member and compression momentarily applied to the female mold members by the connection of the ports 73 and 77 with the ports 93 and 92 through the chamber 91.

Powerful compression is applied to the mold members as they come together at the end of their ascent by a compressing device based on the principle of a toggle joint backed by powerful springs. A rigid backing frame is built up behind the vertically movable mold carrying frame at its upper position. This backing frame is shown as comprising a plurality of horizontally positioned eye beams 108, the rear flanges 109 of which are secured to a heavy plate 110, in turn secured to the columns 7 and 8. A pair of oppositely disposed channel irons 111 are secured to the columns 11 and 12, and backing plates are mounted at each end of these channel irons adjacent the columns 11 and 12. Heavy rods 113, four of which are shown at each side of the machine connect the plates 110 and 112, and are adjustably positioned by means of the lock nuts 114.

The horizontal webs 115 of the channel irons are still further strengthened against lateral thrust by heavy steel plates 116 arranged parallel therewith. A compressing device is provided for each pair of mold members so that each may be independent of the other. One of these devices is shown in cross section in Fig. 1. It comprises a cylindrical casing 117 provided with upper and lower flanges 118 bolted to the channel irons 115 and plates 116, so as to be firmly held in position thereon. A bearing head 119 is fitted longitudinally in the end of the cylindrical casing toward the mold. This head 119 is provided with an extended shaft 120 which passes through a cap 121 screw-threaded into the end of the cylindrical casing 117. The shaft 120 is screw-threaded at its upper end and has mounted thereon adjusting nuts 122. Powerful coiled springs 123 and 124 surround the shaft 120 and seat between the head 119 and the cap 121. It will thus be seen that by means of the nuts 122 any desired degree of compression may be given to the springs 123 and 124 so that their compressing force may be adjusted as desired. This means for adjusting the power of the springs will alter the position of the head 119 with respect to the molds, which must always be the same, and hence it is necessary to provide for an adjustment thereof. This is secured by screwing the cap 121 into and out of the cylindrical casing as required. A link 125 is pivotally connected at 126 in the bearing head 119 in the back and at the center to the lower end of the swinging arm 57 directly back of the center of the female mold member.

It will thus be seen that as the vertically movable mold-carrying frame rises from the pulp vat, the swinging mold member guided by the link 125 will close toward the fixed mold member. When the mold members reach the upper limit of their travel the link 125 will assume a horizontal position, pressing the mold members together with great force between the rigid backing formed by the eye beams 108 and the powerful coiled springs 123 and 124.

During the latter portion of the upward movement of the mold-carrying frame it must slide over the rigid backing under increasing pressure until the uppermost limit is reached, and during the beginning of the descent under similar but reversed pressure. It is necessary, therefore, that there shall be provision for lubrication to take care of this sliding movement, but it is necessary to guard against the oil or other lubricant getting into the vat or pulp, or being carried down into it by reciprocating parts of the apparatus. It is also desirable to provide adjusting means for maintaining the line of reciprocation of the shaft 63 as nearly vertical as possible, notwithstanding any wear of the reciprocating parts with respect to the rigid backing. To secure these results the construction is provided shown in detail in Figs. 7 and 8, and in which the chief element may be termed a floating wedge. These floating wedges are provided at intervals between the rigid backing and the vertically movable mold-carrying frame. To the face of the eye beams 108 in each case is bolted a vertical guide frame 128. A vertical guide way 129 is formed in the face of the guide frame, and overlying vertical plates 130 are bolted to the guide-way. The rear of the vertically movable mold-carrying frame opposite to the guide-way 129 is provided with a vertical track 131 having its surface inclined downwardly and toward the guide-way. A floating wedge 132, preferably somewhat longer than the guide-way has a rear flange 133 fitted and sliding in the guide-way 129, and a forward flange 134 formed parallel to the face of the track 131 and adapted to coöperate therewith. This floating wedge is provided with rearwardly and forwardly extending projections 135 and 136, and in these projections are mounted vertically adjustable set screws 137 and 138 respectively. These set screws at the proper time are connected with a suitable horizontal surface on the guide frame and on the vertically movable mold-carrying frame respectively. The operation of this feature will be apparent. As the vertically movable mold-carrying frame descends the set screw 137 and the floating wedge will come in contact with the upper face of the guide frame 128, and the mold-carrying frame will continue its descent into the pulp, leaving the floating wedge behind. Upon the ascent of the mold-carrying frame it will come into contact with the set screw 138, which will be so adjusted that when this contact takes place the floating wedge will fill the space between the mold-carrying frame and the guide frame, and upon the continued upward movement of the mold-carrying frame it will carry with it the floating wedge and the rear flange 133 and the floating wedge will slide in the guide-way 129. Suitable lubricant may be applied between the flange 133 and the guide-way 129, and lubricant will be unnecessary between the flange 134 and the track 131.

The apparatus thus far described will form the plates or other articles from liquid pulp and leave them in moist condition on the face of the swinging mold member. The plates in this condition are soft and delicate and contain a large amount of moisture. It is necessary that they should next be subjected to a drying operation to remove this moisture. In the preferred use of the invention a drying apparatus is employed through which the plates or other articles are carried upon an endless belt or belts. Such a belt is shown at 139, passing about a pulley 140, in Fig. 1, arranged at a suitable point adjacent the molding machine. The plates must be discharged from the swinging mold members upon the belt, and as a preferred means for securing this result a transferring apparatus forms a part of the invention and is shown more particularly in Figs. 1 and 3. This transferring apparatus is provided with a plurality of movable transferring arms, one for each pivoted mold member, and suction and compressed air operate through these transferring arms to aid in the transfer of the plate from the pivoted mold member to the conveying belt.

A pair of vertical standards 141 and 142 are secured to the floor or other support in front of the pulp vat and beneath the compressing device. These standards at their upper ends are provided with inclined ways 143, and blocks 144 are mounted to slide in these ways. On each standard a rack 145 is arranged below and parallel with the way 143. A hollow shaft 146 is pivotally mounted in the blocks 144 and extends transversely between the standards. This hollow shaft is secured thereto at intervals. The hollow transferrer arms 147 are provided at their ends with pick-off heads 148, there being one transferrer arm and pick-off head for each pivoted mold member mounted to swing in line therewith. A gear 149 is secured to the shaft 146 at each end thereof, and coöperates with the respective racks 145. A shaft 150 is journaled at its ends in the standards 141 and 142 near the base thereof, and extends parallel with the shaft 146. Crank arms 151 and 152 are rigidly connected to the shaft 150 at each end thereof, extend upwardly therefrom and are connected by links 153 with the blocks 144 so that when the shaft 150 is rocked the blocks 144 will be slid in the ways, causing the shaft 146 to move bodily parallel with itself and at the same time to rotate upon its own axis.

The movement of the shaft 150 is caused by a grooved cam 154 mounted upon a shaft 155 journaled in a suitable standard 156, and having at its opposite ends a beveled gear 157 engaging with another beveled gear 158 at the lower end of the shaft 35, from which shaft the transferring device is thus operated. The cam 154 is so shaped that the transferrer arms 147 are swung over beneath the position of the pivoted mold members 56 shown in dotted lines in Fig. 1. When the pivoted mold member reaches its lowermost position, as indicated in dotted lines, the transferrer arm rises to cause the pick-off head to contact with the bottom of the plate held therein. At the time of contact suction takes place in the pick-off head and a puff of compressed air is blown through the pivoted mold member. The plate is thus transferred to the pick-off head on the transferrer arm. The transferrer arm now recedes slightly to enable the pivoted mold member to have its movement without interfering therewith, and thereafter the transferrer arm swings over until the pick-off head is directly above the conveyer belt, when the suction is cut off and compression discharges the plate onto the conveyer belt.

The mechanism for securing proper action of suction and compressed air in the transferring device is located on the standard 156, as shown in Fig. 1. The details of construction of the port members and valve member which go to make up this device are shown in Fig. 4 in perspective. The device comprises a central valve member 159 keyed at 160 to the shaft 155, and two port members 161 and 162 fitting snugly against the opposite faces of the valve member respectively. These port members are provided with depending lugs 163 fitting into the standard 156 and maintaining them in fixed position. They are also provided with apertured lugs 164 to which coiled springs 165 are connected, thus holding the port members yieldingly and snugly against the central valve member. The port member 163 is provided with a single port 166 opening in its face, and a pipe 167 leads therefrom to a suitable source of compressed air. The port member 161 is provided with two ports 168 and 169, the latter being connected by the pipe 170 to a suitable apparatus for producing vacuum, the former being connected by the pipe 171 having a flexible section 172 with the end of the hollow shaft 146, to which connection is made with the various pick-off heads of the transferrer arms.

The rotating valve member 159 is provided in its face adjacent the port member 161 with a segmental chamber 173 concentric with the ports 168 and 169. A port 174 leads from the opposite face of the valve member into this chamber. The ports and chambers are so arranged and timed that as the valve member 173 rotates in the direction of the arrow the chamber 173 covering the ports 168 and 169, and the port 174 being covered by the face of the port member 162, vacuum will be formed in the transferring device. But as the rotation of the valve member continues, at the proper time the rear end of the chamber 173 will pass through the port 169, thus cutting off the vacuum, and when the port 174 comes into line with the port 166 a puff of compressed air will pass through into the port 168, and thus into the transferring device. The proportion and timing of the ports and chambers to secure the proper results will be readily made according to the construction of the machine, but the illustration in Fig. 4 shows with approximate accuracy the arrangement for the machine illustrated.

It will be noted that the mold members reciprocate in two paths, the pulp receiving mold members reciprocating in a vertical path between a position in the compressing device to a position in the pulp vat, while the coöperating mold members reciprocate or oscillate in a curved path between the compressing device and the receiving device.

In the case of the compressing device, it will be observed that there are two abutments, the rigid backing with the floating wedge constituting in effect a fixed abutment, and the head to which the links 125 are pivoted constituting in effect movable abutments.

The connection of the vacuum to the bottom of the mold carrying frame by the flexible hose 6 secures a perfect drainage at all times and whatever may be the vertical position of the molds. All air admitted is admitted above the vacuum connection. The result is that any water soaked from the moist articles by the vacuum is drawn off by the vacuum hose and there is no danger of water being blown back into or forced through the articles being formed in the mold. It will also be noted that the entire system of ports and valves for controlling the admission of compressed air or vacuum to the mold members is quite separate and distinct from the mold members themselves and is connected by passageways to the mold members or chambers in the rear thereof, and that it is not necessary to the invention in its broadest aspect that this system shall travel with the mold members or be located in the particular location herein shown so long as it is suitably connected with the mold members or the chambers in the rear thereof and supplies the compressed air and vacuum at the proper times, as hereinbefore set forth. It will also be noted that the movement of the transferring device herein illustrated and described enables the pick-off head 148 to travel with the female mold member, thus enabling the pick-off head to enter the female member, contact with the plate or other article therein and travel therewith. The female mold member is in constant motion except momentarily at its uppermost and lowermost positions, and this motion involves not only an up and down movement but a movement horizontally, these movements being combined into one curvilinear movement. The construction shown enables the transferring device to have a similar movement while entering the female mold member, taking the plate or other article and withdrawing therefrom.

The invention having been fully described, what is claimed as new and desired to be secured by Letters Patent, is:

1. In an apparatus of the class described, a mold comprising two members, a pulp vat, a compressing device, a receiving device, means to move one mold member in a path between the vat and the compressing device, and means to move concurrently the other mold member in a path between the receiving device and the compressing device.

2. In an apparatus of the class described, a mold comprising two members, a pulp vat, a compressing device, a receiving device, means to cause the simultaneous movement of the said members, one between the vat and the compressing device and the other between the receiving device and the compressing device.

3. In an apparatus of the class described, a mold comprising two members, a pulp vat, a compressing device, a conveyer, a transferring device, supports for the said mold members pivoted together to allow the coöperative action of the said members, means to give a bodily reciprocatory movement to said pivoted supports, means to guide the one member in its reciprocations between positions in the pulp vat and in the compressing device, and means to guide the other member in its reciprocations between positions over the transferring device and in the compressing device.

4. In an apparatus of the class described, a pulp vat, a compressing device located above the pulp vat, a receiving device, a mold member, means to reciprocate it vertically between the compressing device and the pulp vat, a second complemental mold member pivotally mounted on the said first member to swing into and out of coöperation therewith, and means for directing the said swinging movement of the said second mold member to cause it to engage with the first mold member upon entering the compressing device and to swing away from said first mold member to a position over the receiving device upon the movement of the first mold member into the pulp vat.

5. In an apparatus of the class described, a pulp vat, a receiving device at one side thereof, horizontally-arranged fixed and movable abutments located respectively above the vat and the receiving device, a mold member, and means for reciprocating it in a vertical path between the pulp vat and the said fixed abutment, a coöperating mold member pivoted to said first mold member, a link pivoted to the movable abutment and to the coöperating mold member, and means for exerting pressure upon the movable abutment when the said link and mold member are in line between the abutments.

6. In an apparatus of the class described, a mold comprising two members, a horizontally-arranged receiving device, means to move the said mold members into and out of coöperative relation, means to deposit a layer of pulp upon one mold member, means to bring the mold members together to compress the pulp thus deposited, means to separate the mold members, means to transfer the compressed layer of pulp onto the second mold member, means to carry the second mold member into a position over the receiving device, and means to eject the pulp article from the second mold member onto the receiving device.

7. In an apparatus of the class described, a mold comprising two members, means to move said mold members into and out of coöperative relation, means to deposit a layer of pulp upon one mold member, means to bring the mold members together to compress the pulp thus deposited, means to separate said mold members, means to transfer the compressed layer of pulp onto the second mold member, a conveyer, a transferring device movable from receiving to discharging position and having its discharging position over the conveyer, means to carry the second mold member after receiving the layer of pulp into a position over the receiving position of the transferring device, and means to eject the pulp article from the second mold member onto the transferring device.

8. In an apparatus of the class described, a mold comprising two members, means to move said mold members into and out of coöperative relation, means to deposit a layer of pulp upon one mold member, means to bring the mold members together to compress the pulp thus deposited, means to separate said mold members, means to transfer the compressed layer of pulp onto the second mold member, a conveyer, a transferring device movable from receiving to discharging position and having its discharging position over the conveyer, means to carry the second mold member after receiving the layer of pulp into a position over the receiving position of the transferring device, means to eject the pulp article from the second mold member onto the transferring device, and means for retaining the pulp article on the transferring device during the movement thereof from receiving to discharging position.

9. In an apparatus of the class described, a pulp vat, a mold comprising two members, a compressing device, a receiving device, compressed air and vacuum connections to each mold member, means for controlling the action of the compressed air and vacuum whereby a layer of pulp is sucked onto the first mold member and transferred therefrom to the second mold member and discharged from the second mold member to the receiving device, means for operating the mold members to cause one mold member to enter the pulp vat to receive the layer of pulp thereon, means for bringing the said mold members into the compressing device, and means acting upon the withdrawal of the said mold members from the compressing device to carry the coöperating mold member to a position over the receiving device, whereby the article transferred thereto from the first mold member may be ejected therefrom onto the receiving device.

10. In an apparatus of the class described, a mold comprising two members, a pulp vat, a compressing device, a receiving device, means to reciprocate one mold member in a path between the vat and the compressing device, and means to reciprocate the other mold member in a path between the receiving device and the compressing device.

11. In an apparatus of the class described, a mold comprising two members, a pulp vat, a compressing device, a receiving device, means to cause the simultaneous reciprocation of the said members, one between the vat and the compressing device, and the other between the receiving device and the compressing device.

12. In an apparatus of the class described, a mold comprising two members, a pulp vat, a compressing device, means to move one mold member in a path between the vat and the compressing device, and means to move the other mold member concurrently in a path between the compressing device and a discharging position exterior of the vat to prevent it in its movement from entering the vat.

13. In an apparatus of the class described, a mold comprising two members, a pulp vat, a compressing device, means to reciprocate one mold member in a path between the vat and the compressing device, and means to reciprocate the other mold member in a path between a discharging position exterior to the vat and the said compressing device.

14. In an apparatus of the class described, a mold comprising two members, a pulp vat, a compressing device, means to cause simultaneous reciprocation of the said members, one between the vat and the compressing device, and the other between a discharging position exterior of the vat and the compressing device.

15. In an apparatus of the class described, a mold comprising two members, a pulp vat, means to reciprocate said members simultaneously, and means to guide one member into the vat and to prevent the other member from entering the vat.

16. In an apparatus of the class described, a pulp vat, a vertically movable mold-carrying frame mounted thereover, a plurality of pulp receiving mold members mounted on said frame, a plurality of coöperating mold members pivotally mounted on said frame to swing into and out of coöperative relation with the pulp receiving mold members, a receiving device, means for simultaneously swinging the coöperating mold members away from the receiving members and over the receiving device upon the downward movement of the said frame, whereby the formed articles may be discharged from the coöperating mold members on to the receiving device and the pulp receiving mold members may alone enter the vat.

17. In an apparatus of the class described, a pulp vat, a vertically movable mold-carrying frame mounted thereover, a plurality of pulp receiving mold members mounted on said frame, a plurality of coöperating mold members pivotally mounted on said frame to swing into and out of coöperative relation with the pulp receiving members, and a compressing device provided with means for independently pressing each pair of mold members together at the end of the upward movement of the frame.

18. In an apparatus of the class described, a pulp vat, a vertically movable mold-carrying frame mounted thereover, a plurality of pulp receiving members mounted on said frame, a plurality of coöperating mold members pivotally mounted on said frame to swing into and out of coöperative relation with the pulp receiving members, a rigid backing mounted behind the frame in its upper position, a floating wedge member seated on the rigid backing during the downward movement and upon the mold-carrying frame during the final portion of the upward movement thereof, a series of compressors acting independently to force the respective mold members together against the rigid backing during the final portion of the upward movement of the mold-carrying frame.

19. In an apparatus of the class described a pulp vat, a vertically movable mold-carrying frame mounted thereover, a pulp receiving mold member mounted on said frame, a coöperating mold member pivotally mounted on said frame to swing into and out of coöperation with the pulp receiving mold member, the said mold members being provided with a perforated face and a chamber behind said face, flexible connections extending from said frame respectively to a source of vacuum and a source of compressed air, port members carried by said frame and provided with ports connecting respectively with said chambers and the said vacuum and compressed air connections, rotary valve members coöperating with said port members, a vertical shaft mounted in said frame and carrying the said valve members, and means for rotating said shaft during its vertical movement.

20. In an apparatus of the class described, a vertically movable mold-carrying frame, a driving shaft mounted above and parallel to said frame, a pair of transverse shafts mounted one above each end of said frame, gearing connections between each transverse shaft and the driving shaft for driving the transverse shafts in opposite directions, crank arms carried by the transverse shafts, links extending therefrom to the corresponding ends of the frame, means for preventing endwise movement of the driving shaft, and means for adjusting the longitudinal position of the driving shaft and preventing endwise movement thereof.

21. In an apparatus of the class described, a pulp vat, a vertically movable mold-carrying frame mounted thereover, a vacuum hose extending through the vat and connected to the said frame, whereby upon the vertical movement of the frame the pulp in the vat is agitated by the hose.

22. In an apparatus of the class described, a vertically movable mold-carrying frame, pulp receiving mold members mounted thereon, coöperating mold members pivoted thereto to swing into and out of coöperative relation with the pulp receiving mold members, the said coöperating mold members discharging the articles carried thereby when in outwardly swung position, a transferring device comprising an arm swinging in a vertical plane and having its receiving position directly beneath the discharging position of the swinging mold members, and a conveyer to receive the articles from the transferring device.

23. In an apparatus of the class described, a vertically movable mold-carrying frame, pulp receiving mold members mounted thereon, coöperating mold members pivoted thereto to swing into and out of coöperative relation with the pulp receiving mold members, a transferring device comprising an arm swinging in a vertical plane and means for causing the said arm to move in coördination with the coöperating mold members when in the lower portion of their travel, whereby the transferring device may receive the articles from the coöperating mold members during the lower portion of their travel.

24. In an apparatus of the class described, a mold member having a curvilinear oscillating movement, a transferring device oscillating in the plane of movement of said mold member and means for giving a curvilinear movement to the end of the transferring device in coördination with a portion of the movement of the said mold member, whereby the article on the mold member may be discharged to the transferring device during the coördinated movements thereof.

25. In an apparatus of the class described, a mold comprising two members, means to move the said mold members into and out of coöperative relation, means to deposit a layer of pulp upon one mold member, means to bring the mold members together to compress the pulp thus deposited, means to separate the mold members, means to transfer the compressed layer of pulp to the second mold member, a horizontally arranged receiving device having its receiving position outside the path of movement of the first mold member, means to carry the second mold member into a position over the receiving device at its receiving position, and means to eject the pulp article from the second mold member onto the receiving device.

26. An apparatus of the class described, a pulp vat, a mold comprising two members, means to move the said mold members into and out of coöperative relation, means to deposit a layer of pulp upon one mold member, means to bring the mold members together to compress the pulp thus deposited, means to separate the mold members, means to transfer the compressed layer of pulp to the second mold member, a receiving device having its receiving position outside the path of movement of the first mold member and exterior of the vat, means to carry the second mold member into a position over the receiving device at its receiving position and means to eject the pulp article from the second mold member onto the receiving device.

27. In an apparatus of the class described, a pulp vat, a mold comprising two members, a compressing device, a receiving device having its receiving position exterior to the vat, compressed air and vacuum connections to each mold member, means for controlling the action of the compressed air and vacuum whereby a layer of pulp is sucked onto the first mold member and transferred therefrom to the second mold member and discharged from the second mold member to the receiving device, means for operating the mold members to cause one mold member to enter the pulp vat to receive the layer of pulp thereon, means for bringing the said mold members into the compressing device, and means acting upon the withdrawal of the said mold members from the compressing device to carry the coöperating mold member to a position over the receiving device, whereby the article transferred thereto from the first mold member may be ejected therefrom onto the receiving device.

28. In an apparatus of the class described, a movable mold carrying frame, a driving shaft mounted parallel to said frame, a pair of cranks located one at each end of the frame, connections between the said shaft and the said cranks for causing the simultaneous rotation of the cranks in opposite directions, links extending from the cranks to the corresponding ends of the frame, and means for adjusting the longitudinal position of the driving shaft and preventing endwise movement thereof.

29. In an apparatus of the class described, a movable mold carrying frame, a driving shaft mounted parallel to said frame, a pair of cranks located one at each end of the frame, connections between the said shaft and the said cranks for causing the simultaneous rotation of the cranks in opposite directions, links extending from the cranks to the corresponding ends of the frame, a drum rigidly secured to the shaft, plates mounted at each side of the drum and means for adjusting the said plates longitudinally of the shaft whereby the longitudinal position of the driving shaft may be adjusted and endwise movement thereof prevented.

30. In an apparatus of the class described, a pulp vat, a mold carrying frame mounted to move therein, a flexible conduit extending through the vat and connected to the said frame, whereby upon the movement of the frame the pulp in the vat is agitated by the conduit.

31. In an apparatus of the class described, a pulp vat, a vertically movable mold carrying frame mounted thereover, a flexible conduit extending through the vat for connection to an exterior fluid supply and connected to the said frame and coiled in the vat between its connection with the frame and its point of entrance to the vat, whereby upon the vertical movement of the frame the pulp in the vat is agitated by the conduit.

32. In an apparatus of the class described, a mold member having a curvilinear oscillating movement, an oscillating transferring device and means for giving a curvilinear movement to the end of the transferring device in coördination with a portion of the movement of the said mold member, whereby the article on the mold member may be discharged to the transferring device during the coördinated movements thereof.

33. In an apparatus of the class described, a mold member having a curvilinear oscillating movement, a slidable support, a transferring device pivoted on said support, and means for sliding said support and swinging said transferring device thereon to give a curvilinear movement to the end of the transferring device in coördination with a portion of the movement of the said mold member, whereby the article on the mold member may be discharged to the transferring device during the coördinated movements thereof.

34. In an apparatus of the class described, a mold member, a swinging link to the end of which the mold member is pivoted, means for swinging the mold member about its pivot during the swinging movement of the link, an oscillating transferring device and means for giving a movement to the end of the transferring device in coördination with a portion of the movement of said mold member, whereby the article on the mold member may be discharged to the transferring device during the coördinated movements thereof.

35. In an apparatus of the class described, an oscillating transferring device, a source of fluid supply and a flexible conduit connected with said source of fluid supply and the transferring device.

36. In an apparatus of the class described, a sliding support, a transferring device pivotally mounted on said sliding support, means for sliding said support and swinging said transferring device thereon, a flexible conduit connection extending to said transferring device and means for connecting as required the said conduit to a source of either vacuum or compressed air.

37. In an apparatus of the class described, a vertically movable mold carrying frame, a pulp receiving member mounted on said frame, a coöperating mold member, a rigid backing mounted behind the frame in its upper position, a floating wedge member seated on the rigid backing during the movement and upon the mold carrying frame during the final portion of the upper movement thereof, and means for pressing the mold members together acting through said frame and wedged against said backing.

38. In an apparatus of the class described, a vertically movable mold carrying frame, a rigid backing, means for pressing the frame toward the backing during its movement, and means for automatically maintaining the line of reciprocation of the mold carrying frame rectilinear.

39. In an apparatus of the class described, a vertically movable mold carrying frame, a rigid backing, means for pressing the frame toward the backing during its movement, a floating wedge member located between said backing and said frame and acting to maintain the line of reciprocation of the mold carrying frame rectilinear during the action of the pressing means.

40. In an apparatus of the class described, a vertically movable mold carrying frame, a rigid backing, means for pressing the frame toward the backing during its movement, a floating wedge member located between said backing and said frame and acting to maintain the line of reciprocation of the mold carrying frame rectilinear during the action of the pressing means, and means for adjusting the extent of movement of said wedge.

41. In an apparatus of the class described, a pulp vat, a receiving device at one side thereof, horizontally arranged fixed and movable abutments located respectively above the vat and the receiving device, a mold member, and means for reciprocating it in a vertical path between the pulp vat and the said fixed abutment, a coöperating mold member pivoted to said first mold member, a link pivoted to the movable abutment and to the coöperating mold member, and means for exerting pressure upon the movable abutment when the said link and mold member are in line between the abutments, and means for adjusting the degree of said pressure.

42. In an apparatus of the class described, a suitable frame work, a mold carrying frame mounted to move longitudinally in said frame work, a two-part shaft, one part mounted to rotate in and slide with said mold carrying frame, the other part mounted to rotate and slide in said frame work, and a connection between said shaft parts to permit said movements when the alinement of the shaft parts varies.

43. In an apparatus of the class described, a suitable frame work, a mold carrying frame mounted to move longitudinally in said frame work, a two-part shaft, one part mounted to rotate in and slide with said mold carrying frame, the other part mounted to rotate and slide in said frame work, and a connection between said shaft parts to permit said movements when the alinement of the shaft parts varies, valve mechanism carried by the mold carrying frame and controlled by the shaft part therein, and means carried by said frame work for rotating the shaft part sliding therein.

44. In an apparatus of the class described, a longitudinally movable mold carrying frame, a pulp receiving mold member mounted on said frame, a coöperating mold member, each member being provided with a perforated face and a chamber behind said face, flexible connections extending from said frame respectively to a source of vacuum and a source of compressed air, port members carried by said frame and provided with ports connecting respectively with said chambers and the said vacuum and compressed air connections, rotary valve members, a shaft mounted in said frame and carrying the said valve members, and means for rotating said shaft during the longitudinal movement of the frame.

In testimony whereof, I have signed my name to this specification, in the presence of two subscribing witnesses.

MERLE P. CHAPLIN.

Witnesses:
 CALEB A. LEWIS,
 A. A. MERRILL.